US011873821B2

(12) United States Patent
Mitsuda et al.

(10) Patent No.: US 11,873,821 B2
(45) Date of Patent: Jan. 16, 2024

(54) PUMP

(71) Applicant: MITSUBISHI HEAVY INDUSTRIES, LTD., Tokyo (JP)

(72) Inventors: Kimihiko Mitsuda, Tokyo (JP); Shuhei Sasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 188 days.

(21) Appl. No.: 17/432,708

(22) PCT Filed: Feb. 26, 2020

(86) PCT No.: PCT/JP2020/007589
§ 371 (c)(1),
(2) Date: Aug. 20, 2021

(87) PCT Pub. No.: WO2020/175508
PCT Pub. Date: Sep. 3, 2020

(65) Prior Publication Data
US 2022/0170476 A1 Jun. 2, 2022

(30) Foreign Application Priority Data

Feb. 26, 2019 (JP) ................................. 2019-033115

(51) Int. Cl.
*F04D 13/10* (2006.01)
*F04B 47/06* (2006.01)
(Continued)

(52) U.S. Cl.
CPC .............. *F04D 13/10* (2013.01); *F04B 47/06* (2013.01); *F04D 1/06* (2013.01); *F04D 1/08* (2013.01);
(Continued)

(58) Field of Classification Search
CPC .... F04D 13/10; F04D 13/0646; F04D 29/588; F04D 1/06; F04D 13/06; F04D 1/08;
(Continued)

(56) References Cited

U.S. PATENT DOCUMENTS 5,549,447 A * 8/1996 Bevington .......... F04D 13/0646
415/115

FOREIGN PATENT DOCUMENTS

JP 04-124478 A 4/1992

OTHER PUBLICATIONS

International Search Report dated Apr. 7, 2020, issued in counterpart Application No. PCT/JP2020/007589, with English Translation. (4 pages).

(Continued)

*Primary Examiner* — Peter J Bertheaud
(74) *Attorney, Agent, or Firm* — WHDA, LLP

(57) ABSTRACT

A cylindrical gap is formed between a production pipe and a pump stator, the pump stator has a tubular pump casing that surrounds a plurality of pump bodies, the pump casing is provided with a penetrating portion that penetrates the pump casing in a radial direction and communicates with the gap, and the penetrating portion is formed in a portion of the pump casing that faces a pump body, which is located in an intermediate stage of the plurality of pump bodies, in the radial direction.

4 Claims, 8 Drawing Sheets

(51) Int. Cl.
　　　F04D 1/08　　　(2006.01)
　　　F04D 13/06　　(2006.01)
　　　F04D 29/42　　(2006.01)
　　　F04D 29/58　　(2006.01)
　　　H02K 5/128　　(2006.01)
　　　F04D 1/06　　　(2006.01)
　　　H02K 5/132　　(2006.01)
　　　F04D 29/08　　(2006.01)

(52) U.S. Cl.
　　　CPC ......... *F04D 13/06* (2013.01); *F04D 13/0646* (2013.01); *F04D 29/426* (2013.01); *F04D 29/588* (2013.01); *H02K 5/128* (2013.01); *H02K 5/132* (2013.01); *F04D 29/086* (2013.01)

(58) Field of Classification Search
　　　CPC ...... F04D 29/426; H02K 5/132; H02K 5/128; F04B 47/06
　　　See application file for complete search history.

(56) References Cited

OTHER PUBLICATIONS

Written Opinion dated Apr. 7, 2020, issued in counterpart Application No. PCT/JP2020/007589, with English Translation. (6 pages).

\* cited by examiner

PUMP

TECHNICAL FIELD

The present invention relates to a pump.

Priority is claimed on Japanese Patent Application No. 2019-033115 filed Feb. 26, 2019, the content of which is incorporated herein by reference.

BACKGROUND ART

When underground water, crude oil, or the like is pumped from underground, for example, a pump (liquid matter pumping device) disclosed in Patent Document 1 is used.

As such a pump, there is a regress type pump. The regress type pump has a tubular production pipe, a motor stator disposed inside a lower portion of the production pipe, and an inner element accommodated inside the production pipe.

The regress type pump has a configuration that allows an inner element having a plurality of pump bodies and a motor stator to be pulled out to the ground in a state where the production pipe, the motor stator, and electric wires connected to the motor stator are left underground.

CITATION LIST

Patent Document

Patent Document 1: Japanese Unexamined Patent Application, First Publication No. H4-124478

SUMMARY OF INVENTION

Technical Problem

Meanwhile, in the regress type pump having the above configuration, it is necessary to reduce the outer diameter of the inner element.

Thus, an object of the present invention is to provide pump capable of reducing the outer diameter of the inner element.

Solution to Problem

In order to solve the above problems, according to a pump according to one aspect of the present invention, the pump includes an inner element having a plurality of pump bodies that pump an underground liquid into a ground, a pump shaft that extends in a vertical direction and on which the plurality of pump bodies are disposed in the vertical direction, a motor shaft that is connected to one end of the pump shaft and extends in the vertical direction, a magnetic part that is provided on an outer peripheral surface of the motor shaft, and a pump stator that has a tubular shape for accommodating the plurality of pump bodies and extends in the same direction as the pump shaft; a production pipe having a tubular shape extending in the vertical direction, accommodate the inner element inside the production pipe, and support the inner element; and a motor stator disposed at a lower portion of the production pipe and constitute an electric motor together with the magnetic part, a cylindrical gap is formed between the production pipe and the pump stator, the pump stator has a tubular pump casing that surrounds the plurality of pump bodies, the pump casing is provided with a penetrating portion that penetrates the pump casing in a radial direction and communicates with the gap, and the penetrating portion is formed in a portion of the pump casing that faces a pump body, which is located in an intermediate stage of the plurality of pump bodies, in the radial direction.

According to the present invention, by forming the penetrating portion, which penetrates the pump casing in the radial direction and communicates with the gap formed between the production pipe and the pump stator, in the portion of the pump casing that faces the pump body located in the intermediate stage of the plurality of pump bodies in the radial direction, the pump body causes the liquid having the pressure in the intermediate stage to flow into the gap. Accordingly, it is possible to reduce the pressure difference between the inside and the outside of the pump casing.

Accordingly, it is possible to reduce the pressure resistance performance required for the pump casing in which the penetrating portion is formed. Therefore, it is possible to reduce the radial thickness of the pump casing of the pump stator that requires higher pressure resistance than other portions.

That is, it is possible to reduce the outer diameter of the pump stator that constitutes an outer peripheral portion of the inner element. Therefore, the outer diameter of the inner element can be reduced.

Additionally, in the pump according to one aspect of the present invention. The pump stator may include a ring-shaped fitting member that is provided at an upper end of the pump casing and fitted to an inner peripheral surface of the production pipe, a first seal member that performs sealing between an outer peripheral surface of the fitting member and the inner peripheral surface of the production pipe in a circumferential direction, and a second seal member that is disposed below a position where the penetrating portion is formed and above a position where the production pipe supports the inner element and performs sealing in the circumferential direction between au outer peripheral surface of the pump stator and the inner peripheral surface of the production pipe.

By having the first seal member having such a configuration, it is possible to prevent a high-pressure liquid, which has passed through the plurality of pump bodies via a space between the production pipe and the upper end of the pump casing, from flowing into the gap formed between the production pipe and the pump stator.

Additionally, by having the second seal member having the above configuration, a low-pressure liquid (a liquid before passing through the plurality of pump bodies), which has passed through the position where the production pipe supports the inner element, can be prevented from moving to the gap located above the second seal member.

Therefore, it is possible to make airtight the gap which is partitioned by the first seal member and the second seal member in the vertical direction and into which the liquid having the pressure in the intermediate stage flows. Thus, it is possible to maintain a state in which the pressure difference between the inside and the outside of the pump casing is small.

Additionally, in the pump according to the aspect of the present invention, the first and second seal members may be O-rings.

In this way, by using the O-ring as the first and second seal members, the gap into which the liquid having the pressure in the intermediate stage flows can be made airtight.

Additionally, in the pump according to one aspect of the present invention, the first seal member may be a resin liner that covers the outer peripheral surface of the fitting member and abuts the inner peripheral surface of the production pipe, and the second seal member may be an O-ring.

In this way, by using the resin liner as the first seal member and using the O-ring as the second seal member, it is possible to make airtight the gap into which the liquid having the pressure in the intermediate stage flows.

Advantageous Effects of Invention

According to the present invention, the outer diameter of the inner element can be reduced.

DESCRIPTION OF EMBODIMENTS

Hereinafter, embodiments to which the present invention is applied will be described in detail with reference to the drawings.

Embodiment

Figure 1:
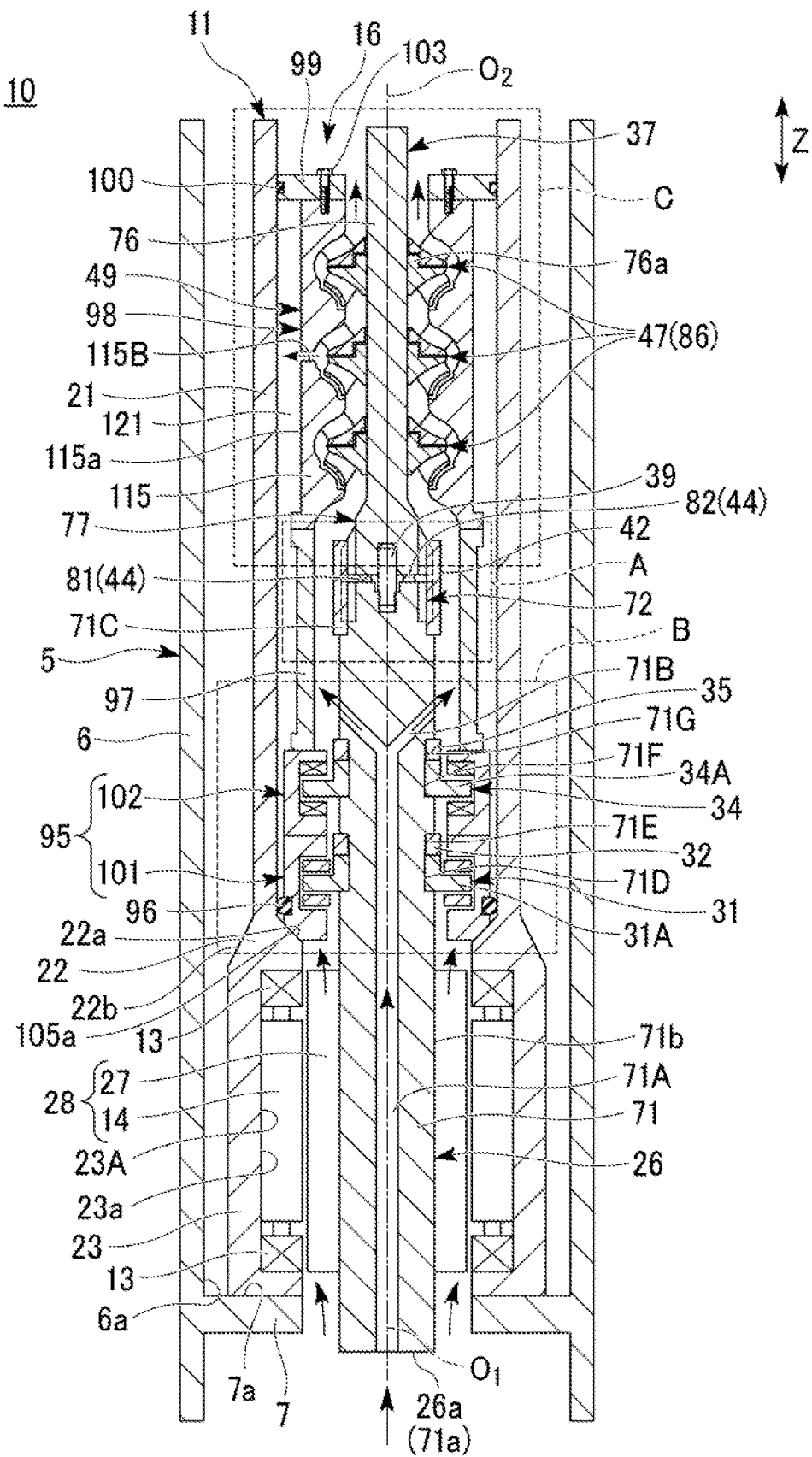
FIG. 1 is a longitudinal sectional view showing a schematic configuration of a pump according to an embodiment of the present invention.
Figure 2:
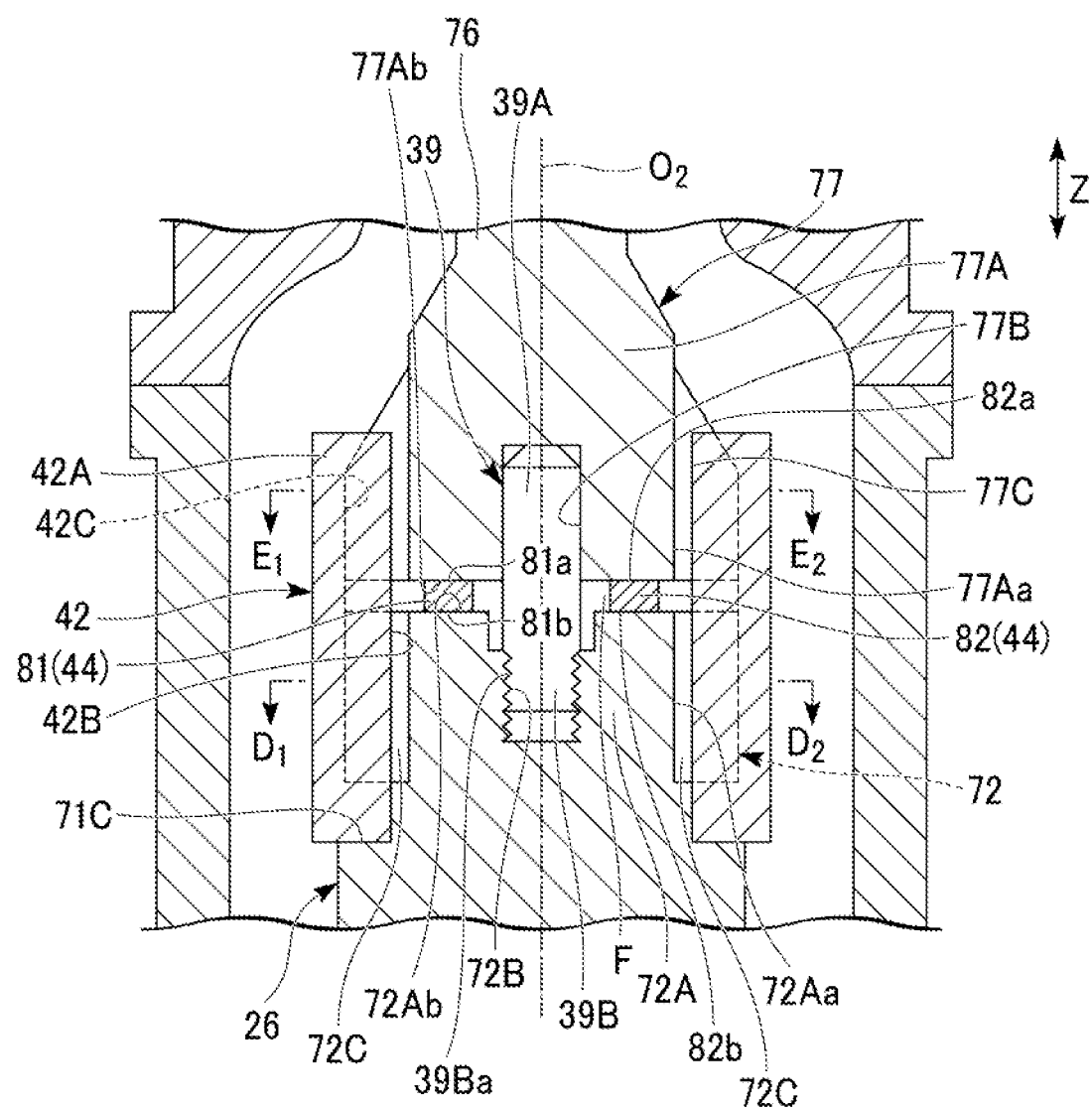
FIG. 2 is an enlarged longitudinal sectional view of a portion of the pump shown in FIG. 1, which is surrounded by a region A.
Figure 3:
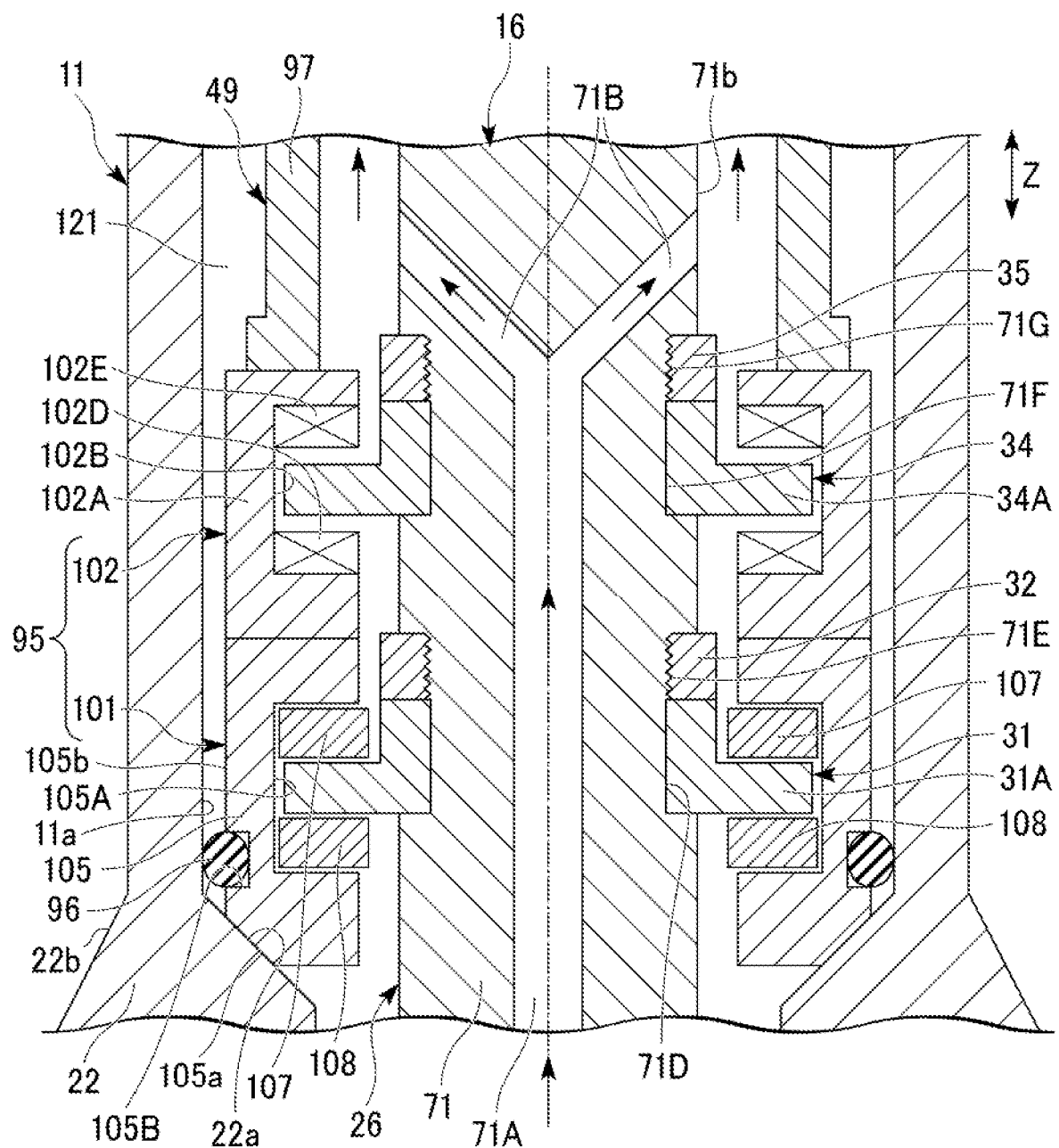
FIG. 3 is an enlarged longitudinal sectional view of a portion of the pump shown in FIG. 1, which is surrounded by a region B.
Figure 4:
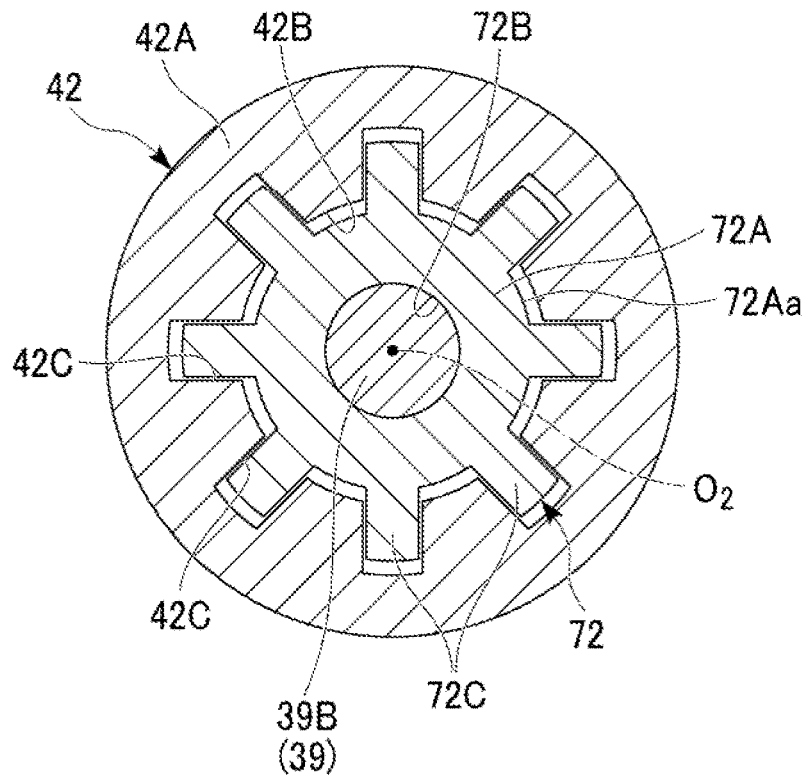
FIG. 4 is a cross-sectional view of a structure shown in FIG. 2, which is taken in the direction of line $D_1$-$D_2$.

A pump 10 according to an embodiment of the present invention will be described with reference to FIGS. 1 to 9. In FIG. 1, $O_1$ indicates a central axis of a production pipe 11 (hereinafter referred to as a "central axis $O_1$"), $O_2$ is a central axis of an inner element 16 (hereinafter referred to as a "central axis $O_2$"), and a Z direction indicates a vertical direction.

FIG. 1 also shows an excavation pipe 5 that is not a component of the pump 10. In FIGS. 1 to 9, the same components are designated by the same reference numerals. The arrows shown in FIGS. 1, 3, and 8 indicate directions in which a liquid (for example, water, crude oil, or the like) is pumped from the underground flows.

The pump 10 is accommodated inside a tubular excavation pipe 5. The excavation pipe 5 has a tubular portion 6 extending in the Z direction and a ring-shaped support portion 7 protruding radially inward from an inner peripheral surface of a lower end portion of the tubular portion 6.

The pump 10 includes the production pipe 11, a radial bearing 13, a motor stator 14, and the inner element 16.

The production pipe 11 has a tubular shape and extends in the Z direction. The production pipe 11 has a tubular portion 21, a support portion 22, and a motor stator accommodating portion 23.

The tubular portion 21 extends in the Z direction and constitutes au upper side of the production pipe 11.

The support portion 22 has a ring shape and is provided between the tubular portion 21 and the motor stator accommodating portion 23. The support portion 22 connects the tubular portion 21 and the motor stator accommodating portion 23. The support portion 22 has a shape of which the diameter is increased in a direction from the tubular portion 21 toward the motor stator accommodating portion 23 (a direction from an upper end toward a lower end of the production pipe 11).

The support portion 22 has a first inclined surface 22a disposed inside and an inclined surface 22b disposed outside (excavation pipe 5 side).

The first inclined surface 22a is inclined in a direction toward the central axis $O_1$ with respect to the direction from the upper end toward the lower end of the production pipe 11. The first inclined surface 22a is a ring-shaped inclined surface.

The inclined surface 22b is inclined in a direction toward the excavation pipe 5 with respect to the direction from the upper end toward the lower end of the production pipe 11. The inclined surface 22b is a ring-shaped inclined surface.

The motor stator accommodating portion 23 has a tubular shape and extends in the Z direction. The motor stator accommodating portion 23 constitutes the lower side of the production pipe 11. A ring-shaped accommodating space 23A is formed inside the motor stator accommodating portion 23. A lower end of the motor stator accommodating portion 23 is supported by an upper surface 7a of the support portion 7.

The radial bearings 13 are disposed at an upper end portion and a lower end portion of the accommodating space 23A.

The motor stator 14 is fixed to an inner peripheral surface 23a of the motor stator accommodating portion 23 that partitions an outer periphery of the accommodating space 23A.

The inner element 16 includes a motor shaft 26, a magnetic part 27, a first thrust collar 31, a first position regulating member 32, a second thrust collar 34, a second position regulating member 35, a pump shaft 37, an implant bolt 39, a spline 42, a spacer member 44, a plurality of pump bodies 47, and a pump stator 49.

The motor shaft 26 has flow path forming shaft portion 71 and a first connecting portion 72.

The flow path forming shaft portion 71 is a shaft portion extending in the Z direction, and a central axis thereof coincides with the central axis $O_2$. The flow path forming shaft portion 71 has a lower end surface 71a (a lower end surface 26a of the motor shaft 26) that reaches the liquid (underground water, crude oil, or the like) pumped to the ground.

The flow path forming shaft portion 71 includes a first liquid flow path 71A, a plurality of second liquid flow paths 71B, a notched portion 71C, a first attachment portion 71D, a first male screw portion 71E, a second attachment portion 71F, and a second male screw portion 71G.

The first liquid flow path 71A extends in the Z direction, a lower end of the first liquid flow path 71A reaches the lower end surface 71a, and an upper end of the first liquid flow path 71A is disposed below the first connecting portion 72. The first liquid flow path 71A is a flow path for guiding the liquid upward from the lower end surface 71a.

Lower ends of the plurality of second liquid flow paths 71B are connected to the upper end of the first liquid flow path 71A. The plurality of second liquid flow paths 71B extend in an obliquely upward direction, and upper ends thereof are exposed from an outer peripheral surface 71b of the flow path forming shaft portion 71.

The liquid derived from the plurality of second liquid flow paths 71B is guided upward (to the ground) by the plurality of pump bodies 47 disposed above the motor shaft 26.

The notched portion 71C is formed on an outer peripheral portion of an upper end of the flow path forming shaft portion 71. The notched portion 71C is a ring-shaped notched portion that supports a lower end of the spline 42.

The first attachment portion 71D is formed in a portion of an outer peripheral portion of the flow path forming shaft portion 71 that is located below the formation position of the plurality of second liquid flow paths 71B and above the magnetic part 27. The first attachment portion 71D is a notched portion in which the first thrust collar 31 is disposed, and regulates the position of an upper end of the first thrust collar 31.

The first male screw portion 71E is formed in a portion of the outer peripheral portion of the flow path forming shaft portion 71 that is located directly above the first attachment portion 71D.

The second attachment portion 71F is formed in a portion of the outer peripheral portion of the flow path forming shaft portion 71 that is located above the first male screw portion 71E. The second attachment portion 71F is a notched portion in which the second thrust cellar 34 is disposed, and regulates the position of an upper end of the second thrust collar 34.

The second male screw portion 71G is formed in a portion of the outer peripheral portion of the flow path forming shaft portion 71 that is located directly above the second attachment portion 71F.

The first connecting portion 72 is provided at the upper end of the flow path forming shaft portion 71. The first connecting portion 72 is formed integrally with the upper end of the flow path forming shaft portion 71. The first connecting portion 72 extends upward from the upper end of the flow path forming shaft portion 71.

The first connecting portion 72 has a first shaft portion 72A, a bolt hole 72B, and a plurality of first protruding portions 72C.

The first shaft portion 72A protrudes above the flow path forming shaft portion 71. The outer diameter of the first shaft portion 72A is configured to be smaller than the outer diameter of the flow path forming shaft portion 71. A central axis of the first shaft portion 72A coincides with the central axis $O_2$.

An upper end surface 72Ab of the first connecting portion 72 is a flat surface.

The bolt hole 72B is formed at the center of the first shaft portion 72A on the upper end surface 72Ab side. The bolt hole 72B extends in the Z direction from the first connecting portion 72 toward the flow path forming shaft portion 71.

The plurality of first protruding portions 72C are disposed at intervals in the circumferential direction of the first shaft portion 72A so as to protrude radially outward from the outer peripheral surface 72Aa of the first shaft portion 72A.

The magnetic part 27 is fixed to the outer peripheral surface 71b of the flow path forming shaft portion 71. The magnetic part 27 is disposed so as to face the motor stator 14 in the radial direction of the flow path forming shaft portion 71. The magnetic part 27 and the motor stator 14 constitute electric motor 28.

The first thrust collar 31 has a annular shape and is inserted into the flow path forming shaft portion 71. The first thrust collar 31 is disposed in the first attachment portion 71D.

The first thrust collar 31 has a ring-shaped thrust collar body 31A protruding radially outward.

The first position regulating member 32 is a ring-shaped member and has a female screw portion capable of being fastened to the first male screw portion 71E formed inside. An upper surface of the first position regulating member 32 abuts against a lower end surface of the first thrust collar 31. The first position regulating member 32 is a member for regulating the position of the first thrust collar 31 in the Z direction with respect to the flow path forming shaft portion 71. As the first position regulating member 32, it is possible to use, for example, a nut.

The second thrust collar 34 has an annular shape and is inserted into the flow path forming shaft portion 71. The second thrust collar 34 is disposed in the second attachment portion 71F. The second thrust collar 34 has a ring-shaped thrust collar body 34A protruding radially outward. The thrust collar body 34A is made of a permanent magnet or a ferromagnetic.

The second position regulating member 35 is a ring-shaped member and has a female screw portion capable of being fastened to the second male screw portion 71G formed inside. An upper surface of the second position regulating members 35 abuts against a lower end surface of the second thrust collar 34. The second position regulating member 35 is a member for regulating the position of the second thrust collar 34 in the Z direction with respect to the flow path forming shaft portion 71. As the second position regulating member 35, it is possible to use, for example, a nut.

The pump shaft 37 is disposed above the flow path forming shaft portion 71 such that a central axis of the pump shaft 37 coincides with the central axis $O_2$.

The pump shaft 37 has a pump shaft body 76 and a second connecting portion 77.

The pump shaft body 76 extends in the Z direction and has a columnar shape. The outer diameter of the pump shaft body 76 is constant in the Z direction.

The second connecting portion 77 is disposed at a lower end of the pump shaft body 76. The second connecting portion 77 is formed integrally with the lower end of the pump shaft body 76. The second connecting portion 77 extends downward from the lower end of the pump shaft body 76.

The second connecting portion 77 is a portion connected to the first connecting portion 72 constituting an upper end portion of the motor shaft 26. The second connecting portion 77 has a second shaft portion 77A, a screw hole 77B, and a plurality of second protruding portions 77C.

The second shaft portion 77A protrudes below the pump shaft body 76. A central axis of the first shaft portion 72A coincides with the central axis $O_2$. The outer diameter of the second shaft portion 77A is configured to be larger than the outer diameter of the pump shaft body 76.

In this way, by making the outer diameter of the second shaft portion 77A larger than the outer diameter of the pump shaft body 76, the strength of the second connecting portion 77 connected to the first connecting portion 72 can be enhanced. The outer diameter of the second shaft portion 77A is configured to be equal to the outer diameter of the first shaft portion 72A.

The second shaft portion 77A has a lower end surface 77Ab facing the upper end surface 72Ab of the first shaft portion 72A.

The screw hole 77B is formed at the center of the lower end surface 77Ab of the second shaft portion 77A. The screw hole 77B extends in the Z direction from the second connecting portion 77 toward the pump shaft body 76. The screw hole 77B faces the bolt hole 72B in the Z direction. The central axis of the screw hole 77B coincides with the central axis of the bolt hole 72B.

The plurality of second protruding portions 77C are disposed at intervals in the circumferential direction of the second shaft portion 77A so as to protrude radially outward from an outer peripheral surface 77Aa of the second shaft portion 77A. The same number of second protruding portions 77C as that of first protruding portions 72C are provided. In a state where the first connecting portion 72 and the second connecting portion 77 are connected to each other, each of the second protruding portions 77C faces one first protruding portion 72C below the second connecting portion 77.

The implant bolt 39 extends in the Z direction. The implant bolt 39 has an upper end portion 39A and a lower end portion 39B.

The upper end portion 39A is fixed to the second shaft portion 77A in a state of being fixed (fastened) to the screw hole 77B. A male screw portion is formed on the upper end portion 39A.

The lower end portion 39B has a male screw portion 39Ba formed at the outer periphery of the lower end portion 39B and the lower end portion 39B is fastened to the bolt hole 72B constituting the first connecting portion 72.

When the implant bolt 39 is attached to the bolt hole 72B, the pump shaft 37 is rotated to fasten the male screw portion 39Ba to the bolt hole 72B. In this case, the fastening of the male screw portion 39Ba to the bolt hole 72B is completed at a position where the first protruding portion 72C and the second protruding portion 77C overlap each other in the Z direction. For this reason, a gap F is formed between the upper end surface 72Ab of the first shaft portion 72A and the lower end surface 77Ab of the second shaft portion 77A.

The implant bolt 39 is a bolt for suspending the motor shaft 26 below the pump shaft 37. The implant bolt 39 regulates the position of the motor shaft 26 in the Z direction with respect to the pump shaft 37.

The spline 42 is disposed so as to surround the outer peripheries of the first and second connecting portions 72 and 77. The spline 42 has a spline body 42A, a shaft portion accommodating portion 42B, and a plurality of protruding portion accommodating portions 42C.

The spline 42 is disposed so as to surround the outer peripheries of the first and second connecting portions 72 and 77. The spline 42 has a spline body 42A, a shaft portion accommodating portion 42B, and a plurality of protruding portion accommodating portions 42C.

The shaft portion accommodating portion 42B is formed so as to penetrate a central portion of the spline body 42A in the Z direction. The shaft portion accommodating portion 42B is a space having a columnar shape. The shaft portion accommodating portion 42B accommodates lower portions of the first shaft portion 72A and the second shaft portion 77A. The inner diameter of the shaft portion accommodating portion 42B is set to a size capable of accommodating the first shaft portions 72A and the second shaft portion 77A.

The plurality of protruding portion accommodating portions 42C are formed in the spline body 42A located outside the shaft portion accommodating portion 42B and are disposed at intervals in the circumferential direction of the shaft portion accommodating portion 42B. One first protruding portion 72C is accommodated in a lower portion of each protruding portion accommodating portion 42C. One second protruding portion 77C is accommodated in an upper portion of each protruding portion accommodating portion 42C.

In this way, the first connecting portion 72 having the plurality of first protruding portions 72C, the second connecting portion 77 having the plurality of second protruding portions 77C, and the spline 42, which surrounds the outer peripheries of the first and second connecting portions 72 and 77 and has the plurality of protruding portion accommodating portions 42C that accommodate the first and second protruding portions 72C and 77C disposed in the Z direction (up-and-down direction), are provided. Accordingly, it is possible to regulate the positions of the first and second connecting portions 72 and 77 in the circumferential direction with the spline 42.

Accordingly, the torque generated when the motor shaft 26 is rotated by the electric motor 28 can be transmitted from the motor shaft 26 to the pump shaft 37 via the spline 42.

In the spline 42 having the above configuration, the male screw portion 39Ba is fastened to the bolt hole 72B such that the first protruding portion 72C and the second protruding portion 77C overlap each other in the Z direction, and then the spacer member 44 is disposed in the gap F and then attached to the outside of the first and second connecting portions 72 and 77.

The spacer member 44 is constituted by first and second spacer members 81 and 82.

The first spacer member 81 is a plate-shaped metallic member having a C-shape in a plan view and has an opening portion 81A. A thickness $M_1$ of the first spacer member 81 is set to a thickness equal to the width of the gap F in the Z direction.

The first spacer member 81 is disposed in the gap F such that the opening portion 81A faces an outer peripheral surface of the implant bolt 39. The first spacer member 81 has an upper surface 81a that abuts against the lower end surface 77Ab of the second connecting portion 77, and a lower surface 81b that abuts against the upper end surface 72Ab of the first connecting portion 72.

The second spacer member 82 is a plate-shaped metallic member having a C-shape in a plan view and has an opening portion 82A. A thickness M2 of the second spacer member 82 is set to a thickness equal to the width of the gap F in the Z direction.

The second spacer member 82 is disposed in the gap F such that the opening portion 82A faces the outer peripheral surface of the implant bolt 39. The opening portion 82A faces the opening portion 81A via the implant bolt 39.

As the first and second spacer members 81 and 82, it is possible to use, for example, track shims. The first and second spacer members 81 and 82 are made after the width of the gap F in the Z direction is measured in advance.

By having the spacer member 44 having such a configuration, a downward hydro load can be transmitted from the pump shaft 37 to the motor shaft 26 via the spacer member 44.

Figure 5:
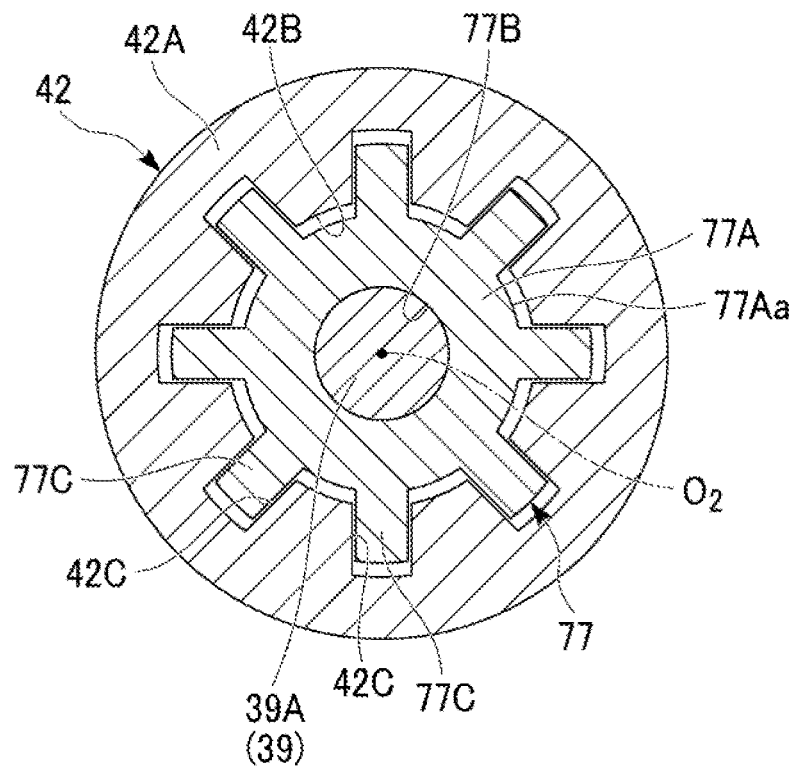
FIG. 5 is a cross-sectional view of the structure shown in FIG. 2, which is taken in the direction of line $E_1$-$E_2$.
Figure 6:
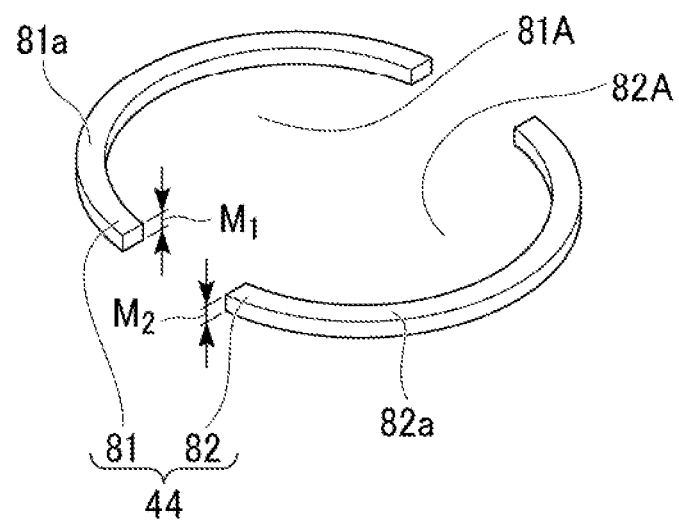
FIG. 6 is a perspective view of a spacer member shown in FIG. 2.
Figure 7:
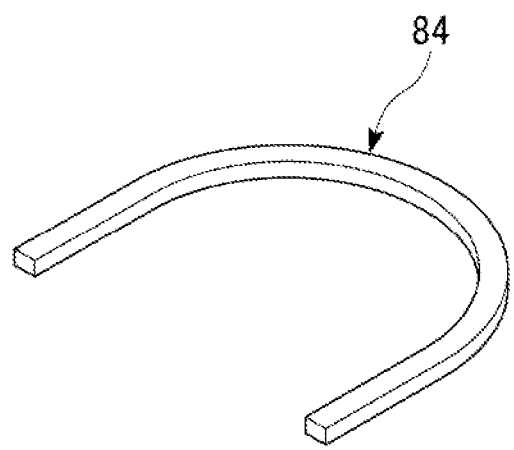
FIG. 7 is a perspective view showing another example of the spacer member.

In addition, in FIG. 5, as an example of the spacer member 44, the first and second spacer members 81 and 82 (two spacer members) having a C-shape have been described as an example. However, for example, one spacer member 84 having a U-shape as shown in FIG. 6 may be used. Even in a case where such a spacer member 84 is used, the same effects as those of the spacer member 44 can be obtained.

The above-described implant bolt 39, spline 42, and spacer member 44 are attached and detached on the ground.

Here, a method of attaching the implant bolt 39, the spline 42, and the spacer member 44 will be described.

First, the first and second spacer members 81 and 82 are disposed on the upper end surface 72Ab of the first connecting portion 72 at the stage before the implant bolt 39 is fastened. Next, the implant bolt 39 is fastened to the second connecting portion 77 such that the first protruding portion 72C and the second protruding portion 74C overlap each other in the Z direction. After that, the spline 42 is disposed outside the first and second connecting portions 72 and 77.

Here, a method of detaching the implant bolt 39, the spline 42, and the spacer member 44 will be described.

First, the inner element 16 is pulled up to the ground. Next, the split 42 is detached from the first and second connecting portions 72 and 77. Next, by rotating the pump shaft 37, the connection between the first connecting portion 72 and the second connecting portion 77 is released. After that, the spacer member 44 is detached.

The plurality of pump bodies 47 are a plurality of impellers 86 and are provided on an outer peripheral surface 76a of the pump shaft body 76. The plurality of impellers 86 are disposed at intervals in the Z direction.

Each impeller 86 has a hub 91 having an annular shape, a shroud 92 (cover) having an annular shape, and a plurality of blades 93.

The hub 91 has an annular shape and has a penetrating portion 91A and a blade forming surface 91a. The pump shaft body 76 is inserted into the penetrating portion 91A such that the blade forming surface 91a faces downward. The hub 91 is fixed to the pump shaft body 76 in a state where the pump shaft body 76 is inserted into the penetrating portion 91A.

The shroud 92 is a cover having an annular shape and has a blade forming surface 92a. The shroud 92 is provided below the hub 91 in a state of being inserted into the pump shaft body 76. The shroud 92 is disposed such that the blade forming surface 92a and the blade forming surface 91a face each other with a gap.

The plurality of blades 93 are provided between the hub 91 and the shroud 92 in a state of being connected to the blade forming surfaces 91a and 92a. The plurality of blades 93 are disposed at intervals in the circumferential direction of the hub 91. The blades 93 adjacent to each other function as a flow path through which the liquid passes.

The plurality of impellers 86 having the above configuration function as centrifugal pumps that guide the liquid derived froth the plurality of second liquid flow paths 71B upward (to the ground) by rotating together with the pump shaft body 76.

Then, the pressure of the liquid heading to the ground rises as the liquid passes through each impeller 86. For this reason, the pressure of the liquid rises each time the liquid passes through the impeller 86.

The pump stator 49 is a tubular member extending in the Z direction and is accommodated inside the production pipe 11.

The pump stator 49 includes a load receiving portion 95, a second seal member 96, a connecting pipe 97, a pump casing 98, a fitting member 99, a first seal member 100, and a bolt 103.

The load receiving portion 95 constitutes a lower portion of the pump stator 49. The load receiving portion 95 includes a mechanical thrust bearing portion 101 and an electromagnetic thrust bearing portion 102.

The mechanical thrust bearing portion 101 includes a first thrust bearing portion body 105 and pad portions 107 and 108.

The first thrust bearing portion body 105 is disposed outside the motor shaft 26 so as to surround the thrust collar body 31A in a ring shape. The first thrust bearing portion body 105 constitutes a lower end portion of the pump stator 49.

The first thrust bearing portion body 105 has a recessed portion 105A, a second inclined surface 105a, an outer peripheral surface 105b, and a ring-shaped groove 105B.

The recessed portion 105A is formed inside the first thrust bearing portion body 105. The recessed portion 105A is a ring-shaped recessed portion that can accommodate the thrust collar body 31A and the pad portions 107 and 108.

The second inclined surface 105a is formed outside a lower end portion of the first thrust bearing portion body 105. The second inclined surface 105a is a ring-shaped inclined surface parallel to the first inclined surface 22a.

The second inclined surface 105a comes into surface contact with the first inclined surface 22a when the pump stator 49 is supported in the production pipe 11.

The second inclined surface 105a comes into surface contact with the first inclined surface 22a when the pump stator 49 is supported in the production pipe 11. The portion where the first inclined surface 22a and the second inclined surface 105a come into surface contact with each other receives loads in the radial direction and the thrust direction.

In this way, by forming the production pipe 11 with the ring-shaped first inclined surface 22a that is inclined in the direction toward the central axis $O_1$ of the production pipe 11 with respect to the direction from the upper end toward the lower end of the production pipe 11 and forming the ring-shaped second inclined surface 105a, which comes into surface contact with the first inclined surface 22a, outside the lower end portion of the pump stator 49, the inner element 16 can be guided into the production pipe 11 by the first and second inclined surfaces 22a and 105a such that the central axis $O_2$ of the inner element approaches the central axis $O_1$ of the production pipe 11 and the inner element 16 can be supported by the production pipe 11.

Accordingly, the positional deviation between the central axis $O_2$ of the inner element 16 supported by the production pipe 11 and the central axis $O_1$ of the production pipe 11 can be reduced.

Additionally, by forming the second inclined surface 105a on the mechanical thrust bearing portion 101 (load receiving portion 95) that receives a large load, the first inclined surface 22a and the second inclined surface 105a are firmly brought into surface contact with each other, and the inner element 16 can be firmly supported by the production pipe 11.

The outer peripheral surface 105b is disposed above the second inclined surface 105a and faces the inner peripheral surface 11a of the production pipe 11 in the radial direction. A tubular gap is formed between the outer peripheral surface 105b and the inner peripheral surface 11a.

The ring-shaped groove 105B is a groove that is recessed radially inward from the outer peripheral surface 105b and is continuous in the circumferential direction.

The pad portion 107 is accommodated in the recessed portion 105A and is provided on an upper surface side of the thrust collar body 31A. The pad portion 107 is disposed in the circumferential direction of the recessed portion 105A. The pad portion 107 is a pad that receives the upper surface side of the thrust collar body 31A.

The pad portion 108 is accommodated in the recessed portion 105A and is disposed on a lower surface side of the thrust collar body 31A. The pad portion 108 is disposed in the circumferential direction of the recessed portion 105A. The pad portion 108 is a pad that receives the lower surface side of the thrust collar body 31A.

As the pad portions 107 and 108, it is possible to use, for example, ceramic pads.

The mechanical thrust bearing portion 101 regulates the position of the first thrust collar 31 in the thrust direction (Z direction). Accordingly, the mechanical thrust bearing portion 101 regulates the position of the motor shaft 26 in the Z direction via the first thrust collar 31.

The electromagnetic thrust bearing portion 102 is provided on the mechanical thrust bearing portion 101. The electromagnetic thrust bearing portion 102 is connected to an upper end of the mechanical thrust bearing portion 101.

The electromagnetic thrust bearing portion 102 includes a second thrust bearing portion body 102A, a recessed portion 102B, and electromagnetic force generating portions 102C and 102D.

In addition, in a case where the thrust collar bodies 31A and 34A are ferromagnets, the electromagnetic force generating portions 102C and 102D are used. In a case where the thrust collar bodies 31A and 34A are permanent magnets, permanent magnets are used instead of the electromagnetic force generating portions 102C and 102D.

The second thrust bearing portion body 102A is disposed outside the motor shaft 26 so as to surround the thrust collar body 34A of the second thrust collar 34 in a ring shape.

The recessed portion 102B is formed inside the second thrust bearing portion body 102A. The recessed portion 102B is a ring-shaped recessed portion that can accommodate the thrust collar body 34A.

The electromagnetic force generating portion 102C is provided on the second thrust bearing portion body 102A so as to face an upper surface of the thrust collar body 34A in the Z direction.

The electromagnetic force generating portion 102D is provided on the second thrust bearing portion body 102A so as to face a lower surface of the thrust collar body 34A in the Z direction.

The electromagnetic thrust bearing portion 102 regulates the position of the second thrust collar 34 in the thrust direction (Z direction) by the electromagnetic forces generated by passing an electric current through the electromagnetic force generating portions 102C and 102D. Accordingly, the electromagnetic thrust bearing portion 102 regulates the position of the motor shaft 26 in the thrust direction.

Since the pump has the mechanical thrust bearing portion 101 and the electromagnetic thrust bearing portion 102 in this way, the thrust direction of the rotating motor shaft 26 is supported by the two bearing portions. Therefore, even when a large load is applied in the thrust direction, the motor draft 26 can be stably supported.

In a case where the liquid pumped to the ground is crude oil, the mechanical thrust bearing portion 101 stably forms a narrow gap between the pad portions 107 and 108 and the thrust collar body 31A and forms an oil film in the gap. Accordingly, it is possible to exhibit stable characteristics as a bearing.

For this reason, in a case where two mechanical thrust bearing portions 101 are provided instead of the mechanical thrust bearing portion 101 and the electromagnetic thrust bearing portion 102, it is difficult to stably form a gap between the pad portions 107 and 108 and the thrust collar body 31A of the two mechanical thrust bearing portions 101, and it is difficult to make the two mechanical thrust bearing portions 101 sufficiently function as thrust bearing portions.

Therefore, as the two bearing portions, a combination of the mechanical thrust bearing portion 101 and the electromagnetic thrust bearing portion 102 is effective.

The second seal member 96 is a ring-shaped seal member, and a radially inner portion thereof is accommodated in the ring-shaped groove 105B. A radially outer portion of the second seal member 96 protrudes radially outward from the outer peripheral surface 105b and abuts against the inner peripheral surface 11a of the production pipe 11.

The second seal member 96 seals a portion between the outer peripheral surface 105b and the inner peripheral surface 11a in the circumferential direction.

Since the pump has the second seal member 96 having such a configuration, it is possible to close the gap formed between the outer peripheral surface 105b and the inner peripheral surface 11a in the circumferential direction. Accordingly, a low-pressure liquid (a liquid before passing through the plurality of pump bodies 47), which has passed between the first inclined surface 22a and the second inclined surface 105a that come into surface contact with each other, can be prevented from moving above the second seal member 96.

The connecting pipe 97 is a tubular member extending in the Z direction and accommodates the motor shaft 26 and the spline 42. A tubular flow path for guiding the liquid to the pump body 47 of the plurality of pump bodies 47 disposed on the bottommost side is formed between the connecting pipe 97 and the motor shaft 26, and between the connecting pipe 97 and the spline 42.

The connecting pipe 97 has a lower end connected to an upper end of the electromagnetic thrust bearing portion 102 and has an upper end connected to a lower end of the pump casing 98. Accordingly, the connecting pipe 97 connects the pump casing 98 and the load receiving portion 95 to each other.

The pump casing 98 has a pump casing body 115, a vane 117, and a partition wall portion 119.

The pump casing body 115 is a tubular member and is provided on the connecting pipe 97. The pump casing body 115 surrounds the region of the pump shaft body 76 where the plurality of pump bodies 47 are provided and the peripheries of the plurality of pump bodies 47.

A plurality of spaces 115A for accommodating the pump bodies 47 are formed inside the pump casing body 115. The plurality of spaces 115A are disposed at intervals in the Z direction.

The pump casing body 115 is accommodated inside the production pipe 11. A gap 121 having a cylindrical shape is formed between the outer peripheral surface 115a of the pump casing body 115 and the inner peripheral surface 11a of the production pipe 11.

The pump casing body 115 is provided with a penetrating portion 115B that penetrates the pump casing body 115 in the radial direction.

The penetrating portion 115B is formed in a portion of the pump casing body 115 that faces the pump body 47 disposed in an intermediate stage among the plurality of pump bodies 47 disposed in the Z direction.

Accordingly, the liquid flowing inside the pump casing body 115 and having a pressure in the intermediate stage flows into the gap 121 via the penetrating portion 115B.

In this way, by forming the penetrating portion 115B, which communicates with the gap 121 formed between the outer peripheral surface 115a of the pump casing body 115 and the inner peripheral surface 11a of the production pipe 11, in the portion of the pump casing body 115 facing the pump body 47 disposed in the intermediate stage among the plurality of pump bodies 47 disposed in the Z direction, the pump body 47 causes the liquid having the pressure in the intermediate stage to flow into the gap 121. Accordingly, it is possible to reduce the pressure difference between the inside and the outside of the pump casing 98.

Accordingly, it is possible to reduce the pressure resistance performance required for the pump casing body 115 in which the penetrating portion 115B is formed. Therefore, it is possible to reduce the radial thickness of the pump casing body 115.

That is, it is possible to reduce the outer diameter of the pump stator 49 that constitutes an outer peripheral portion of the inner element 16. Therefore, the outer diameter of the inner element 16 can be reduced.

Additionally, the outer diameter of the impeller 86 can be increased by making it possible to reduce the radial thickness of the pump casing body 115.

In addition, it is possible to appropriately set the number of penetrating portions 115B.

On the lower end side of the gap 121, the first inclined surface 22a and the second inclined surface 105a are in surface contact with each other in the circumferential direction due to the weight of the inner element 16. For this reason, the liquid having the pressure in the intermediate stage, which has flowed into the gap 121, is unlikely to move downward from the gap 121.

The vane 117 is provided on an inner peripheral surface of the pump casing body 115 that partitions an upper portion of each space 115A. A plurality of the vanes 117 are disposed at intervals in the circumferential direction.

The partition wall portion 119 is an annular member surrounding the pump shaft body 76 and is provided inside the plurality of vanes 117 disposed in each space 115A. The partition wall portion 119 is disposed above the hub 91. The partition wall portion 119 is supported by the plurality of vanes 117.

A lower portion of the partition wall portion 119 has a shape corresponding to the shape of an upper portion of the hub 91. A gap is formed between the partition wall portion 119 and the pump shalt body 76, and between the partition wall portion 119 and the hub 91.

Ae space partitioned by the inner peripheral surface of the pump casing body 115, the partition wall portion 119, and the vanes 117 adjacent to each other functions as a flow path through which the liquid passed through the pump bodies 47 flows.

The fitting member 99 is a ring-shaped member and is provided at an upper end of the pump casing body 115. The fitting member 99 is fixed to the pump casing body 115 by a plurality of the bolts 103 disposed in the circumferential direction.

An outer peripheral portion of the fitting member 99 protrudes radially outward from the outer peripheral surface 115a of the pump casing body 115.

The fitting member 99 has an outer peripheral surface 99a that faces the inner peripheral surface 11a of the production pipe 11 in the radial direction. The fitting member 99 is fitted to the production pipe 11 in a state where the outer peripheral surface 99a abuts against the inner peripheral surface 11a. The fitting member 99 receives a radial force via the production pipe 11.

The fitting member 99 has a ring-shaped recessed portion 99A that is recessed from the outer peripheral surface 99a toward the central axis $O_2$. The recessed portion 99A is exposed from the outer peripheral surface 99a in the circumferential direction.

The first seal member 100 is disposed in the recessed portion 99A. The first seal member 100 abuts against the inner peripheral surface 11a of the production pipe 11.

Accordingly, the first seal member 100 performs sealing between the outer peripheral surface 99a of the fitting member 99 and the inner peripheral surface 11a of the production pipe 11 in the circumferential direction. Therefore, the fluid having the pressure in the intermediate stage, which has flowed into the gap 121, is configured not to escape above the gap 121.

As the first seal member 100, for example, an O-ring can be used.

By having the first seal member 100 having such a configuration and the second seal member 96 previously described, it is possible to seal an upper end and a lower end of the gap 121.

Accordingly, it is possible to prevent the liquid having the pressure in the intermediate stage, which has flowed into the gap 121, from escaping from a lower end side of the gap 121 and prevent the liquid having the pressure in the intermediate stage, which has flowed into the gap 121, from escaping from the lower end side of the gap 121, and it is possible to prevent the liquid pressed from an upper end side of the gap 121 from flowing into the gap 121 and prevent the liquid having the pressure in the intermediate stage, which has flowed into the gap 121, from escaping from the upper end side of the gap 121.

Therefore, since it is possible to make airtight the gap 121 into which the fluid having the pressure in the intermediate stage flows, a state where the pressure difference between the pressure inside the pump stator 49 and the pressure in the gap 121 (the pressure outside the pump stator 49) is small can be maintained.

Figure 8:
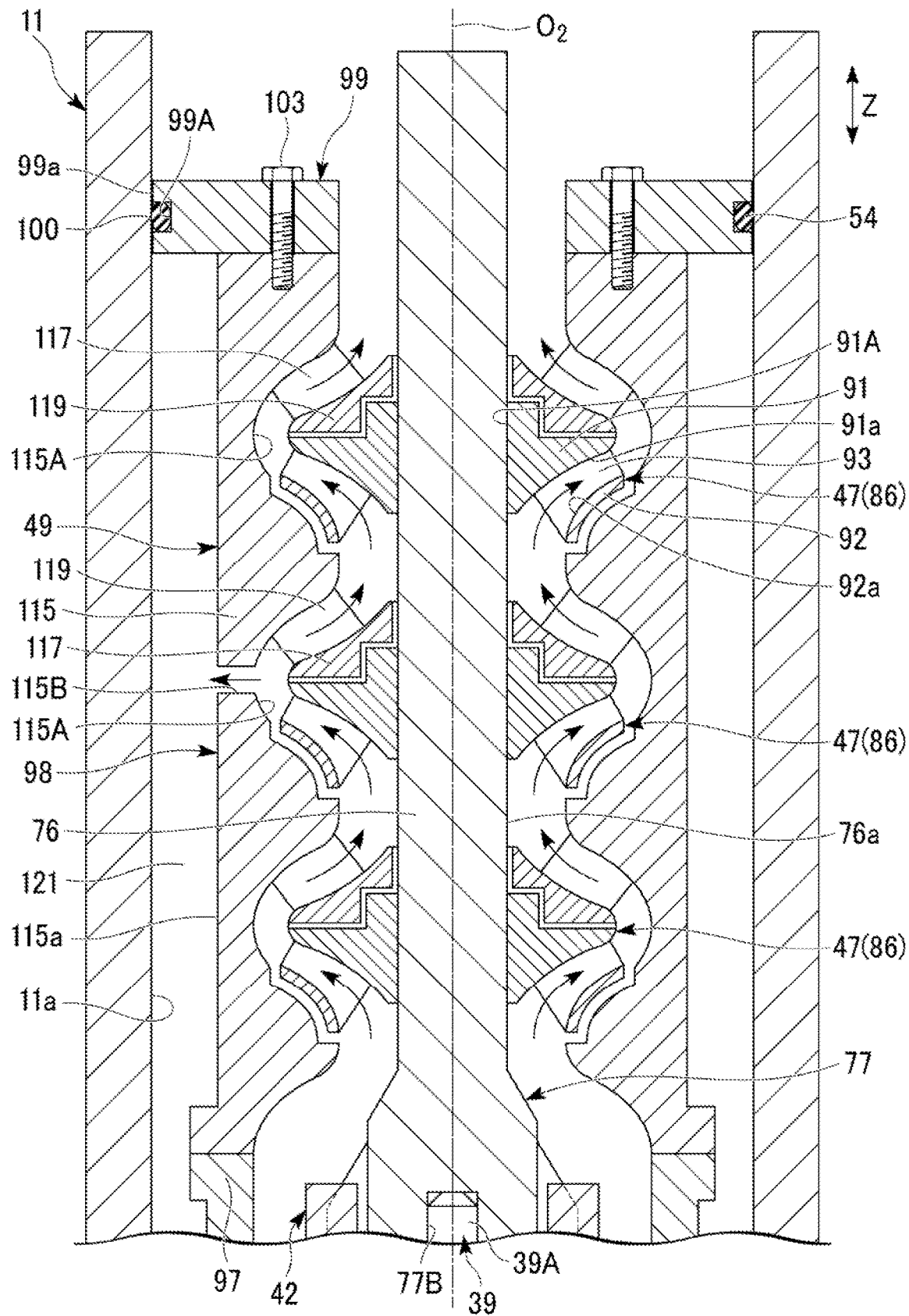
FIG. 8 is an enlarged longitudinal sectional view of a portion of the pump shown in FIG. 1, which is surrounded by a region C.
Figure 9:
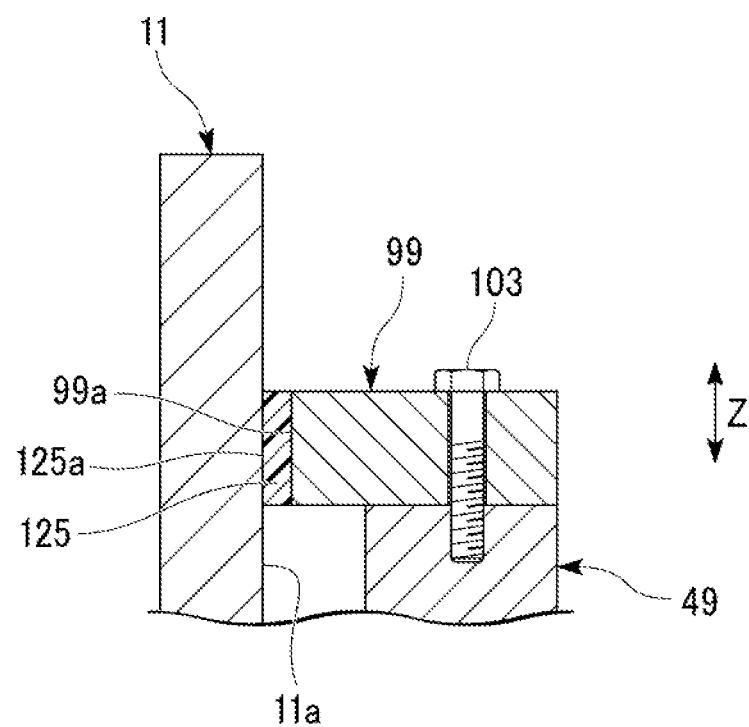
FIG. 9 is a sectional view showing another example of a first seal member.

In addition, although a case where the O-ring is used as the first seal member 100 has been shown as an example in FIGS. 1 and 8, a first seal, member 123 shown in FIG. 9 may be used instead of the first seal member 100.

The first seal member 123 is constituted by a resin liner 125 that covers the outer peripheral surface 99a of the fitting member 99. The resin liner 125 has an outer peripheral surface 125a having a ring shape.

The outer peripheral surface 125a of the resin liner 125 abuts against the inner peripheral surface 11a of the production pipe 11.

According to the pump 10 of the present embodiment, by forming the penetrating portion 115B, which communicates with the gap 121 formed between the outer peripheral surface 115a of the pump casing body 115 and the inner peripheral surface 11a of the production pipe 11, in the portion of the pump casing body 115 facing the pump body 47 disposed in the intermediate stage among the plurality of pump bodies 47 disposed in the Z direction, the pump body 47 causes the liquid having the pressure in the intermediate stage to flow into the gap 121. Accordingly, it is possible to reduce the pressure difference between the inside and the outside of the pump casing 98.

Accordingly, it is possible to reduce the pressure resistance performance required for the pump casing body 115 in which the penetrating portion 115B is formed. Therefore, it is possible to reduce the radial thickness of the pump casing body 115 of the pump stator 49 that requires higher pressure resistance than other portions.

That is, it is possible to reduce the outer diameter of the pump stator 49 that constitutes an outer peripheral portion of the inner element 16. Therefore, the outer diameter of the inner element 16 can be reduced.

Figure 10:
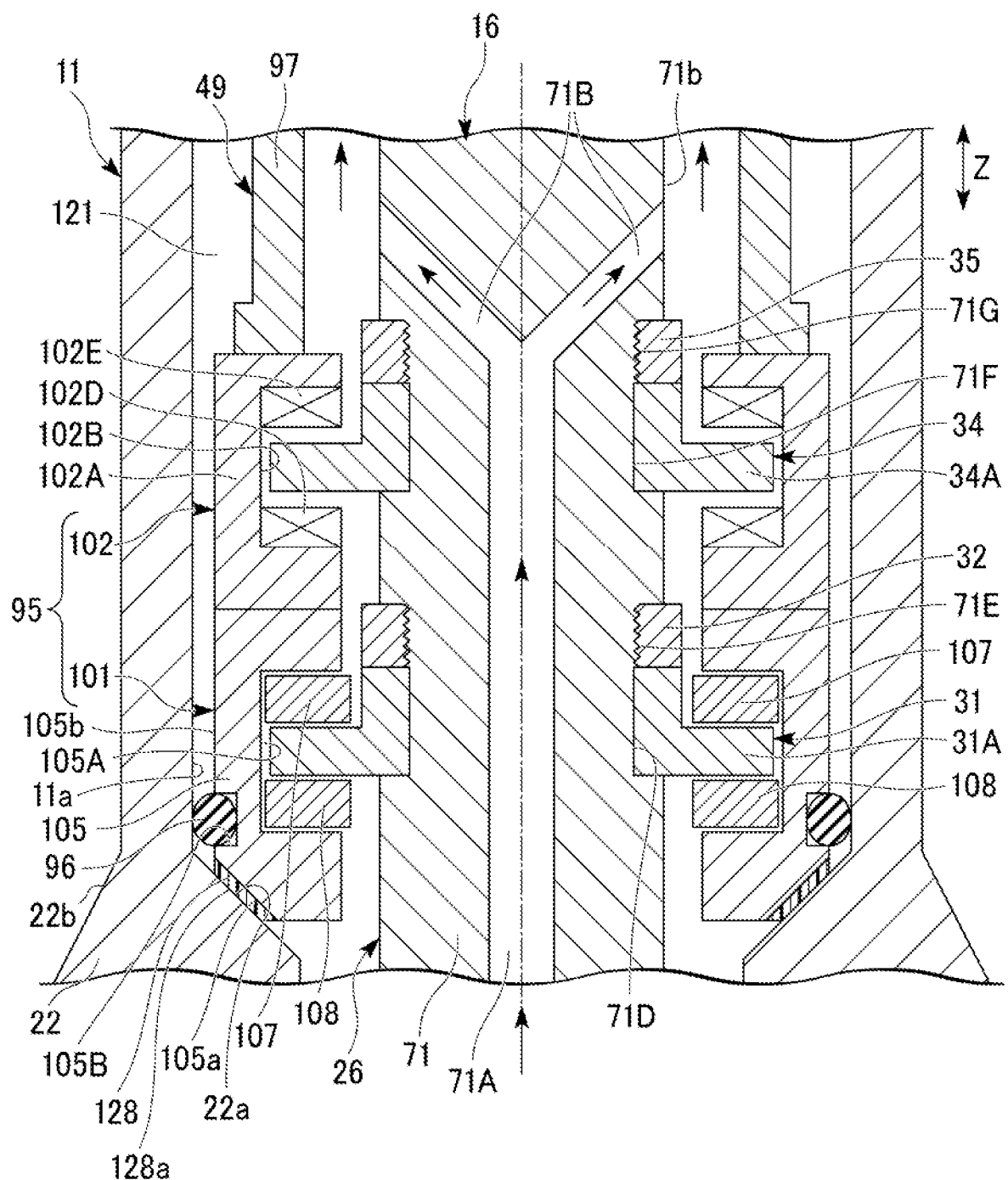
FIG. 10 is a longitudinal sectional view of main parts of a pump including a fluorine-based resin member.

In addition, in the present embodiment, a case where the second seal member 96 disposed in the ring-shaped groove 105B is used for sealing has been described as an example. However, as in the pump 130 shown in FIG. 10, a fluorine-based resin member 128 may be used instead of the ring-shaped groove 105B and the second seal member 96.

The fluorine-based resin member 128 is provided so as to cover the second inclined surface 105a. The fluorine-based resin member 128 has a third inclined surface 128a that comes into surface contact with the first inclined surface 22a. As the material of the fluorine-based resin member 128, it is possible to use, for example, Teflon (registered trademark).

Since the fluorine-based resin member 128 having such a configuration is provided, the same effect as those of the second seal member 96 can be obtained.

Additionally, the ring-shaped groove 105B, the second seal member 96, and the fluorine-based resin member 128 may be used in combination.

Although the preferred embodiment of the present invention has been described in detail above, the invention is not limited to the relevant specific embodiment, and various modifications and changes can be made within the spirit of the invention described in the claims.

INDUSTRIAL APPLICABILITY

The present invention is applicable to pumps.

REFERENCE SIGNS LIST

5: Excavation pipe
6, 21: Tubular portion
7, 22: Support portion
7a, 81a, 82a: Upper surface
10, 130: Pump
11: Production pipe
11a, 23a: Inner peripheral surface
13: Radial bearing
14: Motor stator
16: Inner element
21: Tubular portion
22a: First inclined surface
22b: Inclined surface
23: Motor stator accommodating portion
23A: Accommodating space
26: Motor shaft
26a, 71a, 77Ab: Lower end surface
27: Magnetic part
28: Electric motor
31: First thrust collar
31A, 34A: Thrust collar body
32: First position regulating member
34: Second thrust collar
35: Second position regulating member
37: Pump shaft
39: Implant bolt
39A: Upper end portion
39B: Lower end portion
39Ba: Male screw portion
42: Spline
42A: Spline body
42B: Shaft portion accommodating portion
42C: Protruding portion accommodating portion
44, 84: Spacer member
47: Pump body
49: Pump stator
54: Seal member
71: Flow path forming shaft portion
71A: First liquid flow path
71b, 72Aa, 76a, 77Aa, 99a, 105b, 115a, 125a: Outer peripheral surface
71B: Second liquid flow path
71C: Notched portion
71D: First attachment portion
71E: First male screw portion
71F: Second attachment portion
71G: Second male screw portion
72: First connecting portion
72A: First shaft portion
72Ab: Upper end surface
72B: Bolt hole
72C: First protruding portion
76: Pump shaft body
77: Second connecting portion
77A: Second shaft portion
77B: Screw hole
77C Second protruding portion
81 First spacer member
81b, 82b: Lower surface
81A, 82A: Opening, portion
82: Second spacer member
86: Impeller
91: Hub
91a, 92a: Blade forming surface
91A, 115B: Penetrating portion
92: Shroud
93: Made
95: Load receiving portion
96: Second seal member
97: Connecting pipe
98: Pump casing
99 Fitting member
99A, 102B, 105A: Recessed portion
100, 123: First seal member
101: Mechanical thrust bearing poi ion
102: Electromagnetic thrust bearing portion
102A: Second thrust bearing portion body
102C, 102D: Electromagnetic force generating portion
103: Bolt
105: First thrust bearing portion body
105a: Second inclined surface
105B: Ring-shaped groove
107, 108: Pad portion
115: Pump casing body
115A: Space
117: Vane
119: Partition wall portion
125: Resin liner
128: Fluorine-based resin member
128a: Third inclined surface
A, B: Region
F, 121: Gap
$M_1$, $M_2$: Thickness
$O_1$, $O_2$: Central axis

The invention claimed is:

1. A pump comprising:
an inner element having a plurality of pump bodies that pump an underground liquid, a pump shaft that extends in a vertical direction and on which the plurality of pump bodies are disposed in the vertical direction, a motor shaft that is connected to one end of the pump shaft and extends in the vertical direction, a magnetic part that is provided on an outer peripheral surface of the motor shaft, and a pump stator that has a tubular shape for accommodating the plurality of pump bodies and extends in the same direction as the pump shaft;

a production pipe having a tubular shape extending in the vertical direction; accommodating the inner element inside the production pipe and supporting the inner element; and a motor stator disposed at a lower portion of the production pipe and constituting an electric motor together with the magnetic part, a cylindrical gap is formed between the production pipe and the pump stator, the pump stator has a tubular pump casing that surrounds the plurality of pump bodies, a penetrating portion is provided in the pump casing, the penetrating portion is a hole that penetrates the pump casing in a radial direction from an inside of the pump casing to an outside of the pump casing, and the penetrating portion is formed in a portion of the pump casing that faces a pump body, which is located in an intermediate stage of the plurality of pump bodies, in the radial direction.

2. The pump according to claim 1, wherein the pump stator includes a ring-shaped fitting member that is provided at an upper end of the pump casing and fitted to an inner peripheral surface of the production pipe, a first seal member that performs sealing between an outer peripheral surface of the fitting member and the inner peripheral surface of the production pipe in a circumferential direction, and a second seal member that is disposed below a position where the penetrating portion is formed and above a position where the production pipe supports the inner element and performs sealing in the circumferential direction between an outer peripheral surface of the pump stator and the inner peripheral surface of the production pipe.

3. The pump according to claim 2, wherein the first and second seal members are O-rings.

4. The pump according to claim 2, wherein the first seal member is a resin liner that covers the outer peripheral surface of the fitting member and abuts the inner peripheral surface of the production pipe, and the second seal member is an O-ring.

* * * * *